Patented Nov. 20, 1928.

1,692,493

UNITED STATES PATENT OFFICE.

HEINZ EICHWEDE, ERICH FISCHER, AND CARL ERICH MÜLLER, OF HOCHST-ON-THE-MAIN, GERMANY, ASSIGNORS TO GRASSELLI DYESTUFF CORPORATION, OF NEW YORK, N. Y., A CORPORATION OF DELAWARE.

PROCESS OF DYEING CELLULOSE DERIVATIVES.

No Drawing. Application filed December 23, 1925, Serial No. 77,400, and in Germany January 9, 1925.

Our present invention relates to a process for dyeing cellulose derivatives, especially cellulose esters or ethers. For purposes of this invention we will call such cellulose derivatives substitute compounds of the group including cellulose esters and cellulose ethers. We have found that for this purpose monoazo dyestuffs, containing as coupling component a monoacyl-meta-phenyl-enediamine, are eminently suitable. The diazo compounds required for the preparation of the monoazo dyestuffs may be of any kind, but we have found that those diazo compounds which contain more than one sulfo group are unsuitable for the said purpose. The dyestuffs thus obtained dye cellulose esters and ethers tints of good fastness to washing, rubbing and to light.

The following examples serve to illustrate our invention:

(1) 1 kilo of acetate silk is dyed for ¾ to 1 hour at 60–70° C. in a dyebath containing 20–25 litres in which 20 grams of the dyestuff: 2-chlorobenzene-5-sulfonic acid-1-azo-m-aminoacetanilid, having most probably the formula:

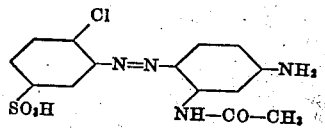

are dissolved, with or without the addition of a salt or acid or with or without the addition of a protective colloid. The dyeing thus produced on the fibre is deep yellow and of good fastness.

(2) If the dyestuff mentioned in the foregoing example is replaced by an equivalent quantity of the dyestuff: 3-nitrobenzene-4-sulfonic acid-1-azo-m-aminoacetanilid, a deep golden-yellow tint of good fastness is obtained on the fibre.

(3) 1 kilo of acetate silk is dyed for ¾ to 1 hour at 60–70° C. in a dyebath of 20–25 litres in which 20 grams of the dyestuff: m-nitrobenzene-azo-m-aminoacetanilid are dissolved, either in the form of its hydrochloride or in a colloidal form, with or without the addition of a salt. In this manner a deep yellow-orange tint of good fastness is obtained.

The diazo compounds named in the foregoing examples may be replaced by any other diazo compounds of the benzene- and napthalene series. On the other hand, there may be substituted for the m-aminoacetanilid any other acyl-m-phenylenediamine capable of being coupled, or homologue or substitution product thereof. As all the dyestuffs in question still contain a free amino group, they may be diazotized on the fibre and subjected in the usual manner to an after-treatment with the developing agent.

In the following claims we understand by the term monoacyl-meta-phenylenediamine also the homologues and substitution products of this compound.

We claim:

1. Process of dyeing compounds of the group including cellulose esters and cellulose ethers consisting in using for the dyeing process monoazo dyes obtainable by coupling a diazo compound containing at the most one sulfo group with a monoacyl-meta-phenylenediamine.

2. Process of dyeing compounds of the group including cellulose esters and cellulose ethers consisting in using for the dyeing process monoazo dyes obtainable by coupling a diazo compound containing at the most one sulfo group with meta-aminoacetanilide.

3. Process of dyeing compounds of the group including cellulose esters and cellulose ethers consisting in using for the dyeing process the monoazo dye obtainable by coupling diazotized 2-chloro-1-aminobenzene-5-sulfonic acid with meta-aminoacetanilide.

4. Compounds of the group including cellulose esters and cellulose ethers dyed with monoazo dyes obtainable by coupling a diazo compound containing at the most one sulfo group with a monoacyl-meta-phenylenediamine.

5. Compounds of the group including cellulose esters and cellulose ethers dyed with monoazo dyes obtainable by coupling a diazo compound containing at the most one sulfo group with meta-aminoacetanilide.

6. Compounds of the group including cellulose esters and cellulose ethers dyed with the monoazo dye obtainable by coupling diazotized 2-chloro-1-amino-benzene-5-sulfonic acid with meta-amino-acetanilide.

In testimony whereof, we affix our signatures.

HEINZ EICHWEDE.
ERICH FISCHER.
CARL ERICH MÜLLER.